United States Patent
Borntraeger

(10) Patent No.: US 8,262,538 B2
(45) Date of Patent: Sep. 11, 2012

(54) TRANSMISSION DEVICE AND METHOD FOR OPERATING A TRANSMISSION DEVICE

(75) Inventor: Kai Borntraeger, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 596 days.

(21) Appl. No.: 12/525,114

(22) PCT Filed: Jan. 25, 2008

(86) PCT No.: PCT/EP2008/050838
§ 371 (c)(1),
(2), (4) Date: Jul. 30, 2009

(87) PCT Pub. No.: WO2008/095790
PCT Pub. Date: Aug. 14, 2008

(65) Prior Publication Data
US 2010/0105517 A1    Apr. 29, 2010

(30) Foreign Application Priority Data
Feb. 3, 2007    (DE) .......................... 10 2007 005 525

(51) Int. Cl.
*B60W 10/02* (2006.01)
*B60W 10/08* (2006.01)

(52) U.S. Cl. ............................................. 477/5; 477/15
(58) Field of Classification Search .................. 477/3, 5, 477/7, 8, 15; 74/745, 331, 333, 343, 345
See application file for complete search history.

(56) References Cited

U.S. PATENT DOCUMENTS

| | | | |
|---|---|---|---|
| 4,100,821 A | 7/1978 | Geiger | |
| 5,404,772 A | 4/1995 | Jester | |
| 6,560,521 B1 * | 5/2003 | Sakamoto et al. | 701/51 |
| 6,591,705 B1 * | 7/2003 | Reik et al. | 74/343 |
| 6,805,648 B1 * | 10/2004 | Ehrlinger | 475/5 |
| 6,883,395 B2 | 4/2005 | Lanz | |
| 7,223,201 B2 * | 5/2007 | Colvin et al. | 477/5 |
| 2006/0025272 A1 * | 2/2006 | Pelouch | 475/214 |
| 2008/0000312 A1 * | 1/2008 | Lang et al. | 74/340 |
| 2009/0107289 A1 * | 4/2009 | Borntrager | 74/745 |

FOREIGN PATENT DOCUMENTS

| | | |
|---|---|---|
| DE | 25 51 934 B1 | 4/1977 |
| DE | 31 40 900 A1 | 6/1982 |
| DE | 195 02 560 A1 | 8/1996 |
| DE | 197 22 496 A1 | 12/1997 |
| DE | 19859458 A1 * | 6/1999 |
| DE | 19853825 C1 * | 1/2000 |

(Continued)

*Primary Examiner* — Justin Holmes
(74) *Attorney, Agent, or Firm* — Davis & Bujold, P.L.L.C.

(57) ABSTRACT

A transmission device with at least two multi-gear transmission groups. Torque is introduced via a input shaft into the transmission groups and into the other transmission group via a main shaft. The input shaft is directly connected with the main shaft via a shifting element during a gearshift to achieve an intermediate gear. When the intermediate gear is engaged, torque passes to the shafts connected to each other via the shifting element. A method for operating transmission, during the gearshift, includes introducing torque from the electric machine to the shafts connected via the shifting element and adjusting the rotational speed of the input shaft to the rotational speed of the target gear. A further shifting element is engaged in the first transmission group, the shifting element is disengaged, and torque of the electric machine is reduced, once the rotational speeds of the input shaft and the target gear match one another.

9 Claims, 8 Drawing Sheets

FOREIGN PATENT DOCUMENTS

| | | |
|---|---|---|
| DE | 19931770 A1 * | 1/2001 |
| DE | 19934696 A1 * | 5/2001 |
| DE | 102 50 733 A1 | 6/2003 |
| DE | 102 31 609 A1 | 1/2004 |
| DE | 203 09 913 U1 | 11/2004 |
| DE | 103 43 992 A1 | 4/2005 |
| DE | 202005004207 U1 * | 12/2005 |
| DE | 102004050757 A1 * | 4/2006 |
| DE | 102005005616 A1 * | 8/2006 |
| DE | 102005018662 A1 * | 11/2006 |
| DE | 102006024370 A1 * | 12/2007 |
| EP | 1 059 470 A1 | 12/2000 |
| EP | 1127731 A2 * | 8/2001 |
| GB | 814 724 | 6/1959 |
| GB | 2 297 366 A | 7/1996 |
| GB | 2346124 A * | 8/2000 |
| WO | 2005/121604 A1 | 12/2005 |
| WO | WO 2006107202 A1 * | 10/2006 |

* cited by examiner

TRANSMISSION DEVICE AND METHOD FOR OPERATING A TRANSMISSION DEVICE

This application is a National Stage completion of PCT/EP2008/050838 filed Jan. 25, 2008, which claims priority from German patent application serial no. 10 2007 005 525.2 filed Feb. 3, 2007.

FIELD OF THE INVENTION

The invention relates to a transmission device and a method for operating a transmission device.

BACKGROUND OF THE INVENTION

A multi-group transmission and a method for operating a multi-group transmission are known from DE 10 2006 024 370.6. The multi-group transmission or, as the case may be, the automated multi-group manual transmission which is, for example, used in commercial vehicles comprises at least two multi-gear transmission groups that are arranged one behind the other by means of which a plurality of gears can be shifted. A first transmission group is associated with a transmission input shaft which can be connected via a starting element to a drive motor of a vehicle, while a second transmission group is associated with a main transmission shaft. In addition, a load-shifting element is provided for establishing a temporary direct connection between the transmission input shaft and the main transmission shaft by means of which, when shifting gears from an actual gear to a target gear, an intermediate gear can be shifted.

The previously described construction of the multi-group transmission makes it possible to directly connect a transmission input shaft and a transmission output shaft by means of a load-shifting element in order to reduce the rotational speed of a drive engine of a drive train of a vehicle via the starting element, such as a starting clutch, and in that way use the dynamic torque of the drive engine to engage an intermediate gear, while the shifting claws and synchronizations of the two transmission groups are switched into their neutral position during gear shifting. In that way, a drive torque of the drive unit is diverted to the intermediate gear. The second transmission group is shifted without any load and can be re-shifted after adjustment of the rotational speed via the load-shifting element of the intermediate gear which is operated in a slipping state.

Disadvantageously, however, depending on the gear change required at any given time and the number of intermediate gears during the shifting operation, no complete tractive force is supported, because the intermediate gear does not have the same gear ratio as the required target gear. The intermediate gear has an inherently smaller gear ratio than the desired target gear, because a secondary side of the load-shifting element, which is designed as a clutch, must rotate more slowly than the half of the clutch that is configured as the primary side or, as the case may be, the drive-unit side of the clutch when shifting into an intermediate gear, because otherwise the power flow in the drive train will be reversed.

SUMMARY OF THE INVENTION

The object of the invention therefore is to provide a transmission device and a method for operating a transmission device by means of which shifting operations are possible without torque interruption.

Inventively, this object is attained with a transmission device and a method for operating a transmission device as disclosed herein.

The inventive transmission device has at least two multiple-gear transmission groups. A torque of a transmission input shaft can be introduced by means of input shaft into one of the transmission groups and can be transmitted to the other transmission group via the main transmission shaft. During a change in gear ratio from an actual to a target gear, the transmission input shaft can be at least temporarily connected directly to the main transmission shaft by means of a load-shifting element in order to achieve an intermediate gear. Inventively, an electrical machine is provided by means of which a torque can be introduced into the shafts that are connected to each other by the load-shifting element, at least with an engaged intermediate gear.

For this reasons when a gear change is required in the transmission device, it is possible in a simple manner to avoid a reduction in traction or, as the case may be, a drop in tractive force to the level of the gear ratio of the intermediate gear by introducing a torque generated by the electric machine in addition to the drive torque of a drive unit of a vehicle drive train.

With the inventive method of operating a transmission device, during a shifting operation from an actual gear to a target gear, it is envisioned that the transmission capacity of the load-shifting element is increased during a shifting operation until the transmission input shaft and the main transmission shaft are connected, and the first transmission group is load-free. Subsequently, at least one shifting element provided to achieve the actual gear is disengaged. A torque generated by the electric machine and rectified to a torque of the transmission input shaft is conducted into the shafts that are interconnected by means of the load-shifting element, i.e., the transmission input shaft and the main transmission shaft, and the transmission capability of the load-shifting element is increased in order to bring the speed of the transmission input shaft up to the level of the rotational speed of the target gear, whereby the shifting element for achieving the target gear is engaged, the load-shifting element is disengaged, and the torque of the electric machine is reduced to at least approximately zero, when the rotational speed of the transmission input shaft corresponds at least approximately to the rotational speed of the target gear.

With the inventive method when there is a demand for a change of gears in a transmission device, a torque acting on the transmission input shaft is transmitted directly to the main transmission shaft with the load-shifting element engaged, and the first transmission group is shifted without load. That results in torque support diminishing to the value of the torque transmission of the engaged intermediate gear. In order to compensate at least partially for the torque reduction, a torque with the same direction is generated by the electric machine in addition to the drive torque acting on the transmission input shaft, and the torque generated by the electric machine is transmitted to the interconnected shafts, thereby compensating for the loss of tractive force. The load-shifting element which is preferably operated in a slipping state transmits the drive torque of the transmission input shaft and the torque of the electric machine to the main transmission shaft. In order to adjust the rotational speed of the transmission input shaft to the rotational speed of the target gear, the transmission capacity of the load-shifting element is increased. In that way the rotational speed of the transmission input shaft is reduced until it matches the rotational speed of the target gear. In the latter operating state of the transmission device, the target gear can be engaged, and the load-shifting element can be disengaged, while the torque of the electric machine is again reduced to zero, whereby the shifting operation is concluded.

With both the inventive transmission device and the method of operating such a transmission device, a drop in tractive force in the automated transmission can be compensated for with intermediate gear-shifting, whereby a transmission device with intermediate gear-shifting can be combined with an Electronic Starting Element (EDA), an integrated stator generator (ISG), or a crankshaft stator generator (KSG).

This means that in the case of a transmission device according to the invention, the hybrid functions that are possible with EDA, ISG or KSG, such as recuperation or boost operation can also be used without interruption during shifting operations in the transmission device in addition to the production of torque-interrupting shifting.

BRIEF DESCRIPTION OF THE DRAWINGS

Additional advantages and advantageous embodiments of the invention can be seen from the patent claims and the examples of execution that that are described in principle with reference to the drawing, whereas the description, in the interest of clarity, the same reference signs are used for components with the same construction and function.

The drawings show.

DETAILED DESCRIPTION OF THE PREFERRED EMBODIMENTS

Figure 1:
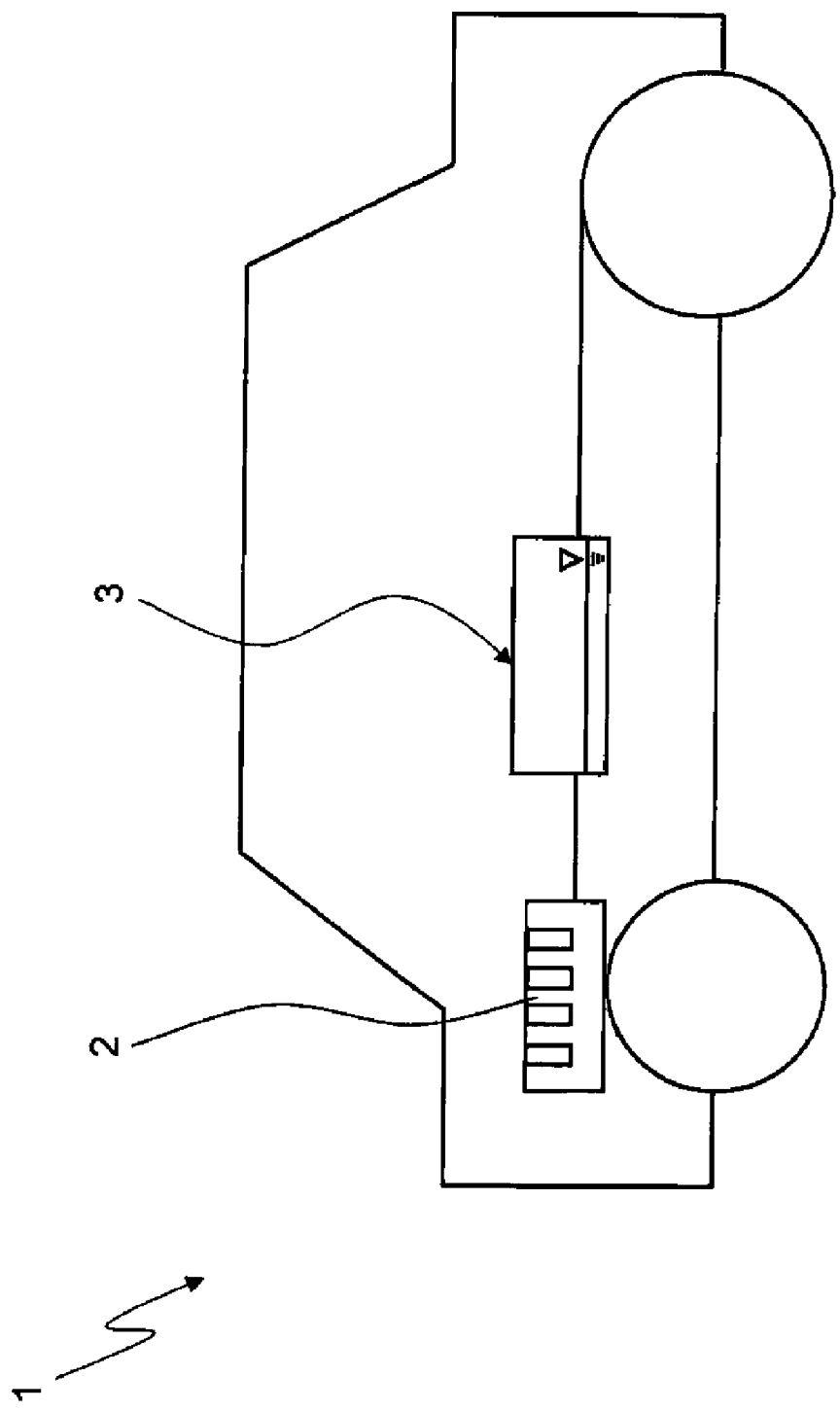
FIG. 1 A highly schematized depiction of a vehicle that is provided with a transmission device according to the invention.
Figure 2:
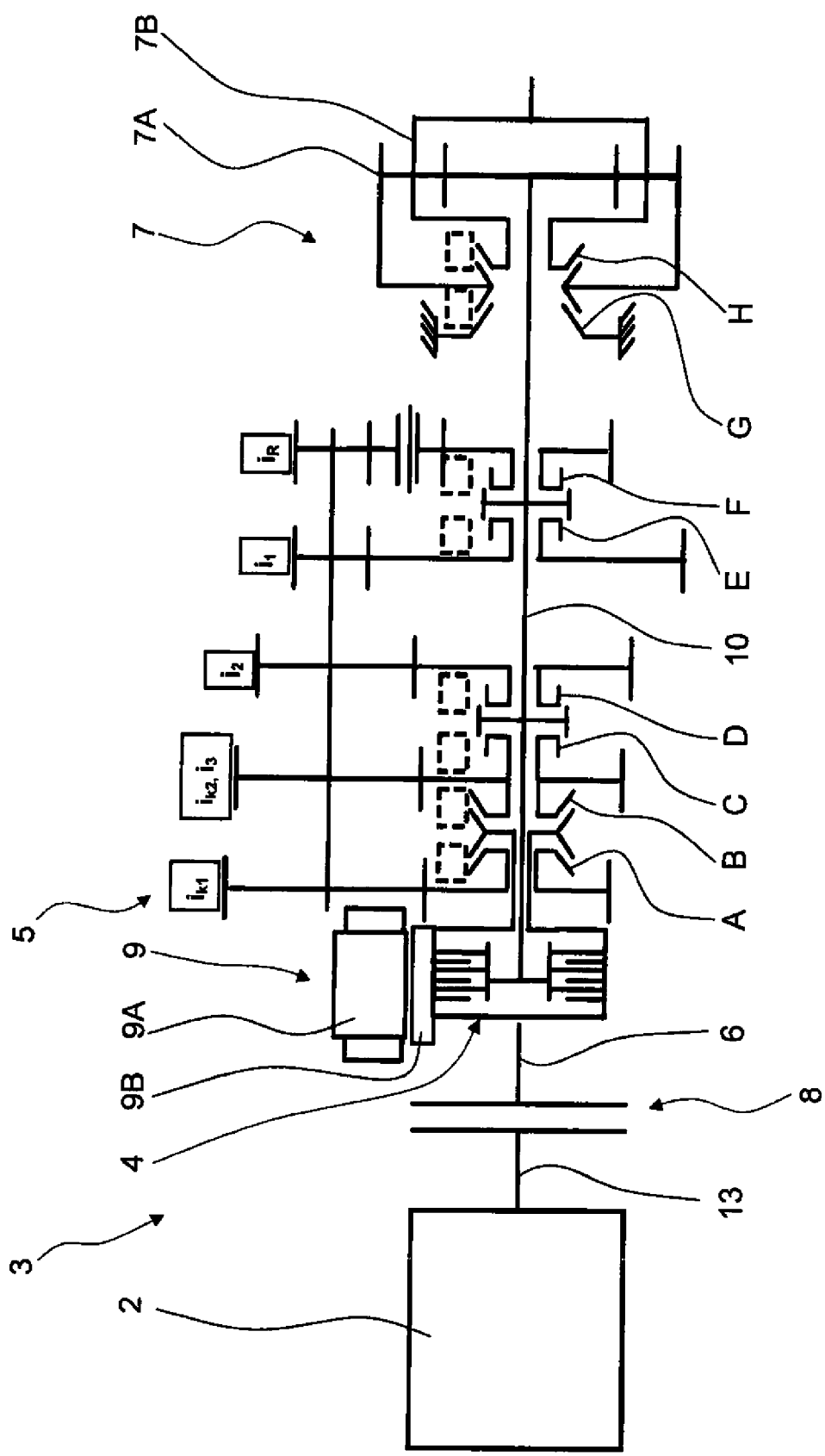
FIG. 2 A wheel diagram of a first embodiment of the inventive transmission device.
Figure 3:
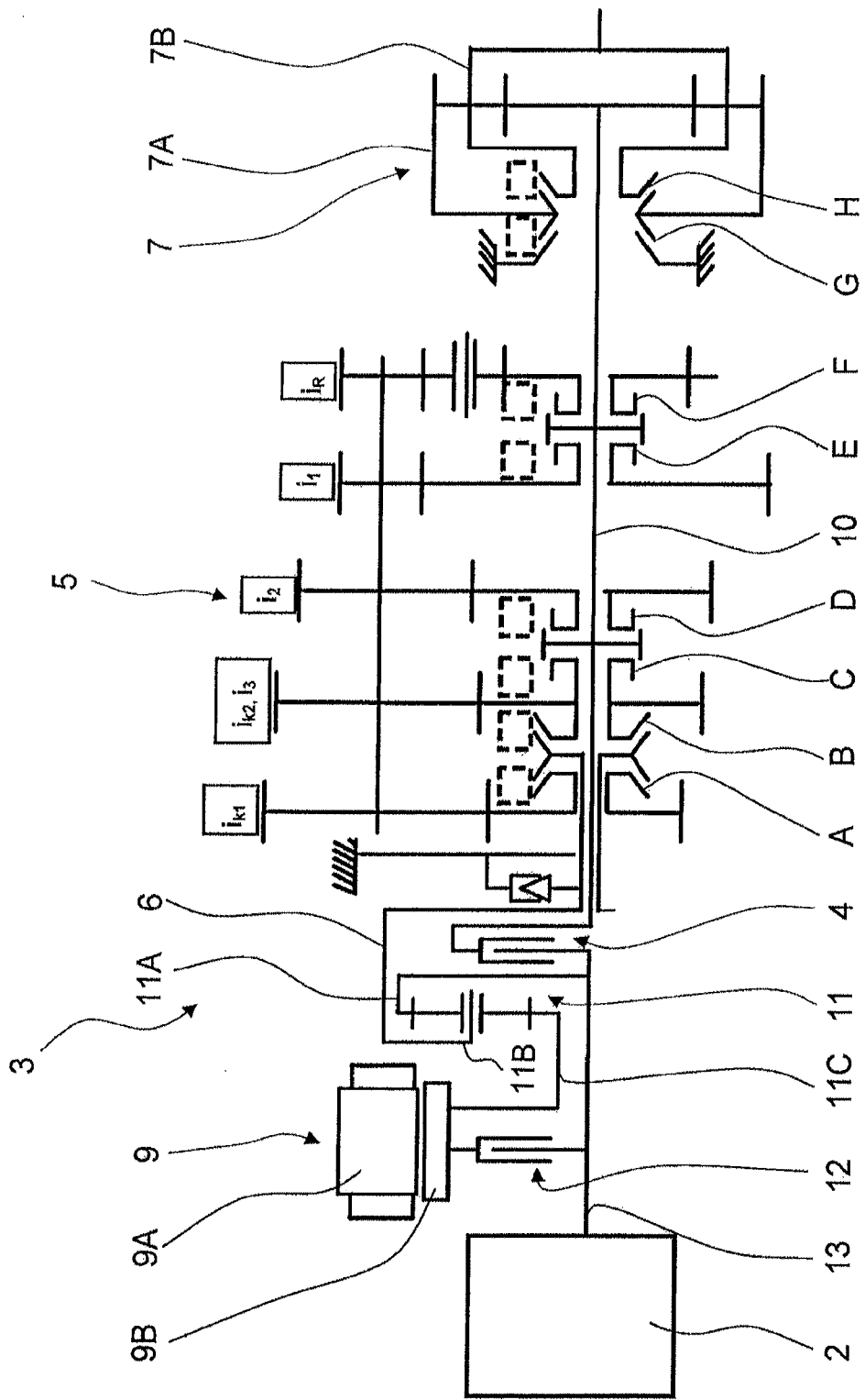
FIG. 3 A wheel diagram of a second embodiment of the inventive transmission device.
Figure 4:
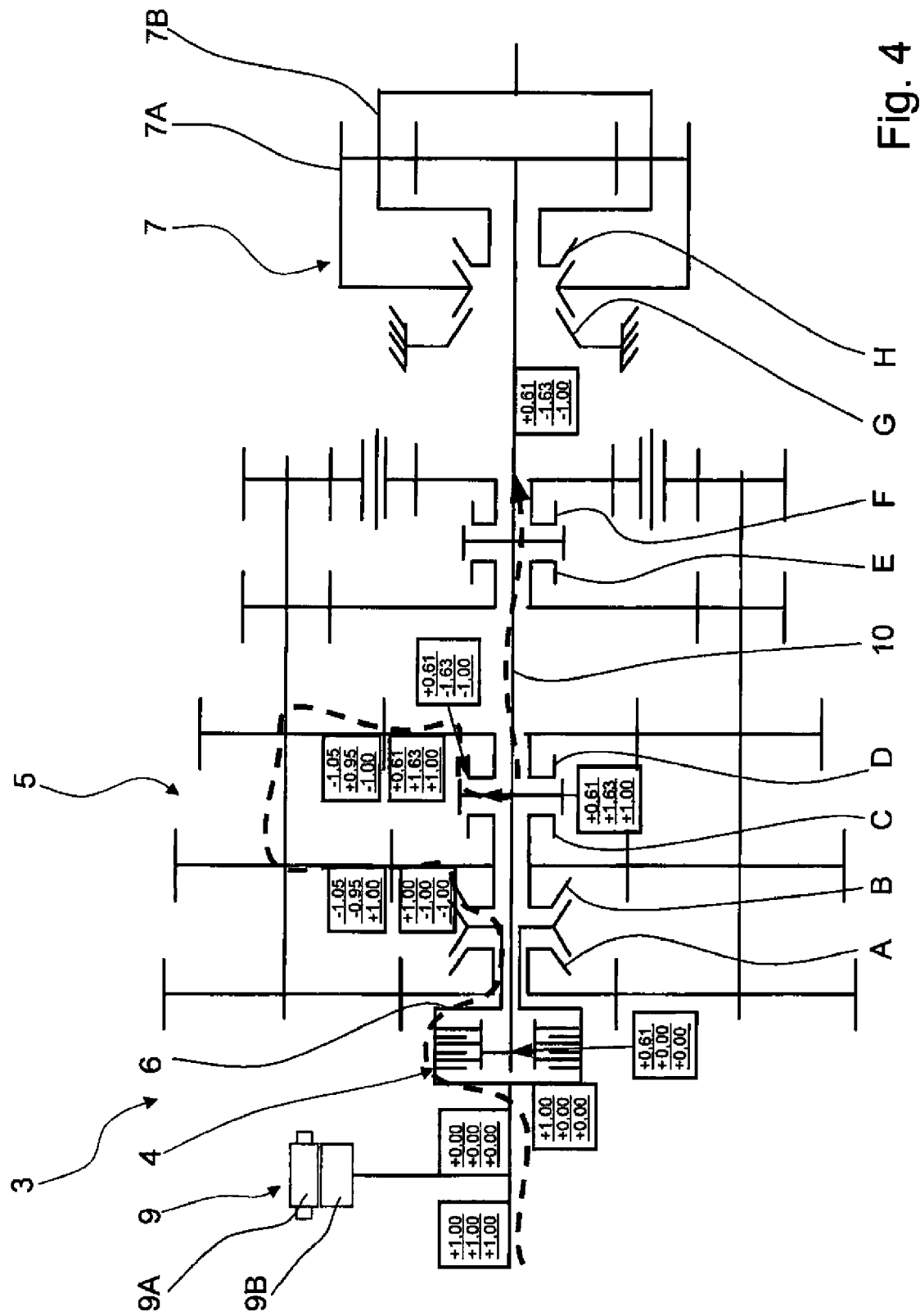
FIG. 4 A wheel diagram of a third embodiment of the inventive transmission device with a graphically depicted torque flow with an engaged actual gear.
Figure 5:
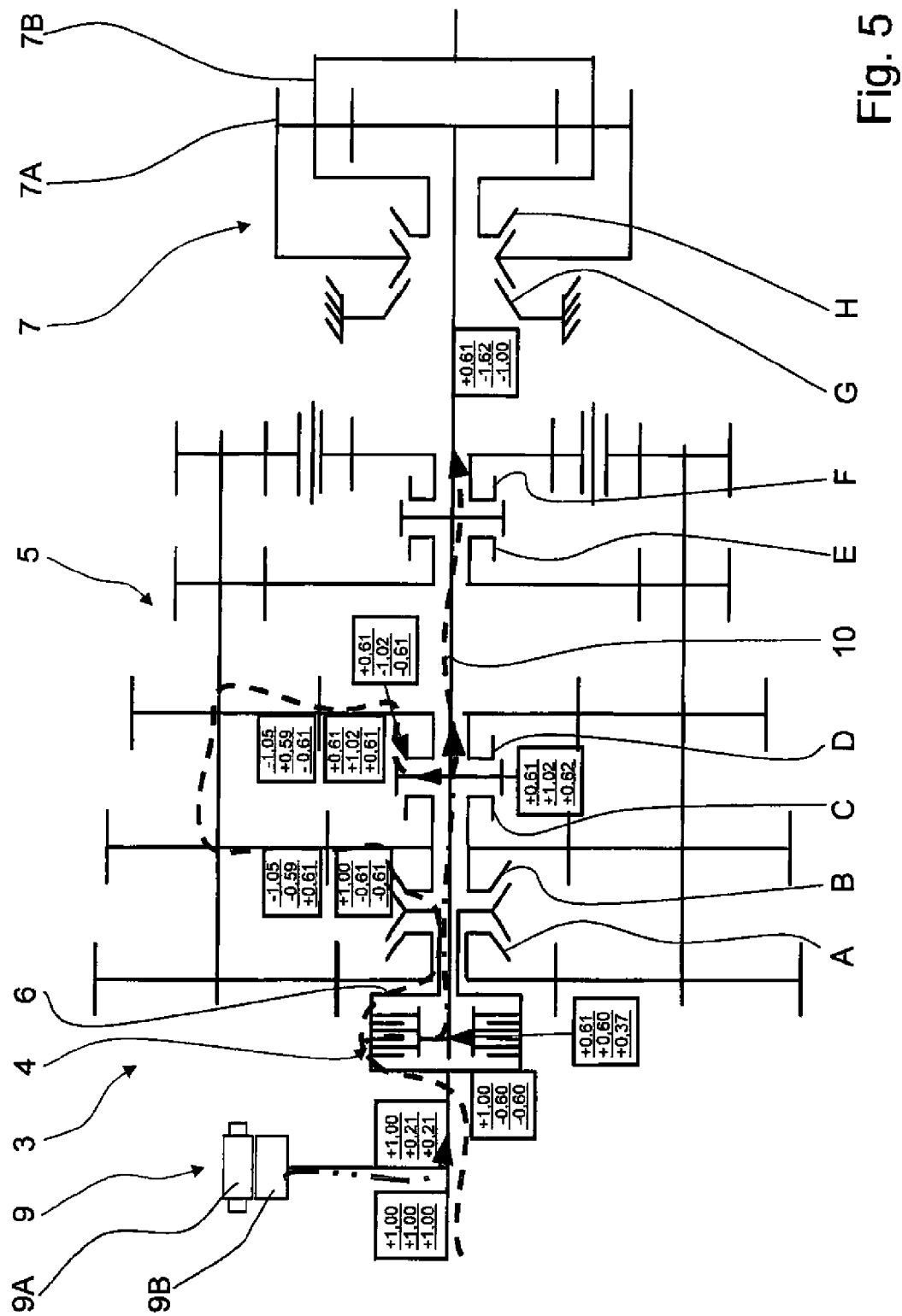
FIG. 5 A wheel diagram of the transmission device according to FIG. 4 with a graphically depicted torque flow during a gear change from an actual gear in the direction of the target gear during a disengagement of the actual gear and the engagement of an intermediate gear.

FIG. 1 presents a highly schematized presentation of a vehicle 1 that is designed in the known manner with an internal combustion engine 2 and a transmission device 3. At the same time, FIG. 2 to FIG. 4 show different configurations of the transmission device 3 in the form of wheel diagrams, which are explained in more detail in the following description.

In principle, a plurality of forward drive positions and one reverse drive position can be achieved with the presented execution examples of the transmission device 3, whereas the different gear ratios depend on the actuation of different shifting elements A to H and load-shifting element 4. In this case, the load-shifting element 4 is designed as a frictionally engaged multi-disc clutch, and shifting elements A, B, G, and H are configured as known synchronizations. The shifting elements C, D, E, and F are configured as positive-locking shifting elements, preferably as claw shifting elements.

The transmission device 3 comprises a first transmission group 5 and a second transmission group 7 that is located downstream of a transmission input shaft 6. The first transmission group 5 is configured as a countershaft manual transmission, and the second transmission group 7 is designed as a planetary gear set in which leave as ring gear 7A of the second transmission group 7 can be fixed on to the side of the housing via the shifting element G, and a planet carrier 7B can be connected in a rotationally fixed manner to the ring gear 7A via shifting element H.

In this case, between the transmission device 3 and the internal combustion engine 2, there is a starting element 8 designed as a frictionally engaged multiple-disc clutch for starting the vehicle 1 according to FIG. 1 in a known manner by means of the internal combustion engine 2. In addition, an electric machine 9 is provided on the transmission input side, whereas a stator 9A is provided in a rotationally fixed manner and a rotor 9B of the electric machine 9 is connected in a rotationally fixed manner to the transmission input shaft 6 and a clutch-half of the load-shifting element 4. The other clutch-half of the load-shifting element 4 is connected in a rotationally fixed manner to a main transmission shaft 10, whereas the transmission input shaft 6 can be directly connected to the main transmission shaft 10 with the load-shifting element engaged in the previously described manner.

A wheel diagram of a second embodiment of the inventive transmission device 3 is depicted in FIG. 3 where the transmission device 3 according to FIG. 3 is different from the first example embodiment shown in FIG. 2 only in the region between the internal combustion engine 2 and the load-shifting element 4 which is why in the following description only the differences are described in detail.

The electric machine 9 of the transmission device 3 according to FIG. 3 is executed here as an EDA, and as functionally connected to the transmission input shaft 6 by means of a transmission-input side planetary gear set 11. During a starting operation of the vehicle 1 according to FIG. 1, an additional shifting element 12 is disengaged, so that a drive torque of the internal combustion engine 2 is introduced into the planetary gear set 11 via an engine output shaft 13 which is fixedly connected to a ring gear 11A of the planetary gear set 11.

The rotor 9B of the electric machine 9 is connected to a sun gear 11C of the planetary gear set 11, so that a drive torque is first present on the drive side of the vehicle 1 during support from the electric machine. When the starting operation is finished, the shifting element 12 is engaged and the planetary gear set 11 is locked, whereby the engine output shaft 13 is directly connected to the transmission input shaft 6. In order to connect the transmission input shaft directly to the main transmission shaft 10, the load-shifting element 4 has to be engaged in the manner described in FIG. 2 along with the additional shifting element 12.

FIG. 4 depicts a third embodiment of the inventive transmission device 3 that is different from the execution example depicted in FIG. 2 only in the region of the first transmission group 5 which in the execution example in FIG. 4 is depicted as a dual countershaft transmission, which is why, with reference to the fundamental functioning of the transmission device 3, reference is made to the description in FIG. 2.

The boxes assigned to the gearwheel pairs of the wheel diagrams shown in FIG. 4 to FIG. 7 contain numbers, the uppermost number in each case corresponding to a rotational speed, the middle number to a torque, and the bottom number to an output. The values refer in each case to the rotational speed of one, the torque of one, and the output of one at the transmission input.

The inventive method of operating the transmission device 3 will be described in more detail below by means of FIG. 4 to FIG. 7, wherein the use of the inventive method fundamentally results in it being possible to carry out shifting operations that are almost free of torque interruption.

In FIG. 4 the power flow from the transmission input shaft 6 via the load-shifting element 4 and through the first transmission group 5 in the direction of the second transmission group 7 is graphically depicted by means of the dotted line, when the tenth forward drive position is engaged, whereby in order to achieve the tenth forward drive position, the load-shifting element 4 is disengaged, and the shifting elements B and D in the first transmission group 5 are engaged.

When there is a shifting demand for an upshift from a tenth forward drive position, which is an actual gear, in the direction of the eleventh drive position, which is the target gear, the load-shifting element 4 is progressively engaged. In that way, the torque that is introduced via the transmission input shaft 6 into the first transmission group 5 is increasingly transferred from the transmission input shaft 6 via the load-shifting element 4 directly to the main transmission shaft 10, whereby the share of the drive torque transmitted directly via the load-shifting element 4 to the main transmission shaft 10 is graphically depicted by the dash-dot line in FIG. 5. The intermediate gear of the transmission device 3 that is engaged by means of engaging the load-shifting element 4 corresponds in this case to a twelfth forward drive position with the smallest gear ratio of the transmission device 3, so that when shifting from the actual gear or, as the case may be, the tenth forward gear into the intermediate gear or, as the case may be, the twelfth forward gear, there is a drop in torque.

In order to compensate for the drop in torque, a torque that is rectified to the drive torque of the internal combustion engine 2 is introduced by means of the motor-driven electric machine 9, which is functionally connected to the transmission input shaft 6, into the shafts 6 and 10 that are connected by means of the load-shifting element 4. Here the torque generated by the electric machine 9 matches the drop in torque caused by shifting into the intermediate gear, so that the drop is compensated for in a simple manner.

Figure 6:
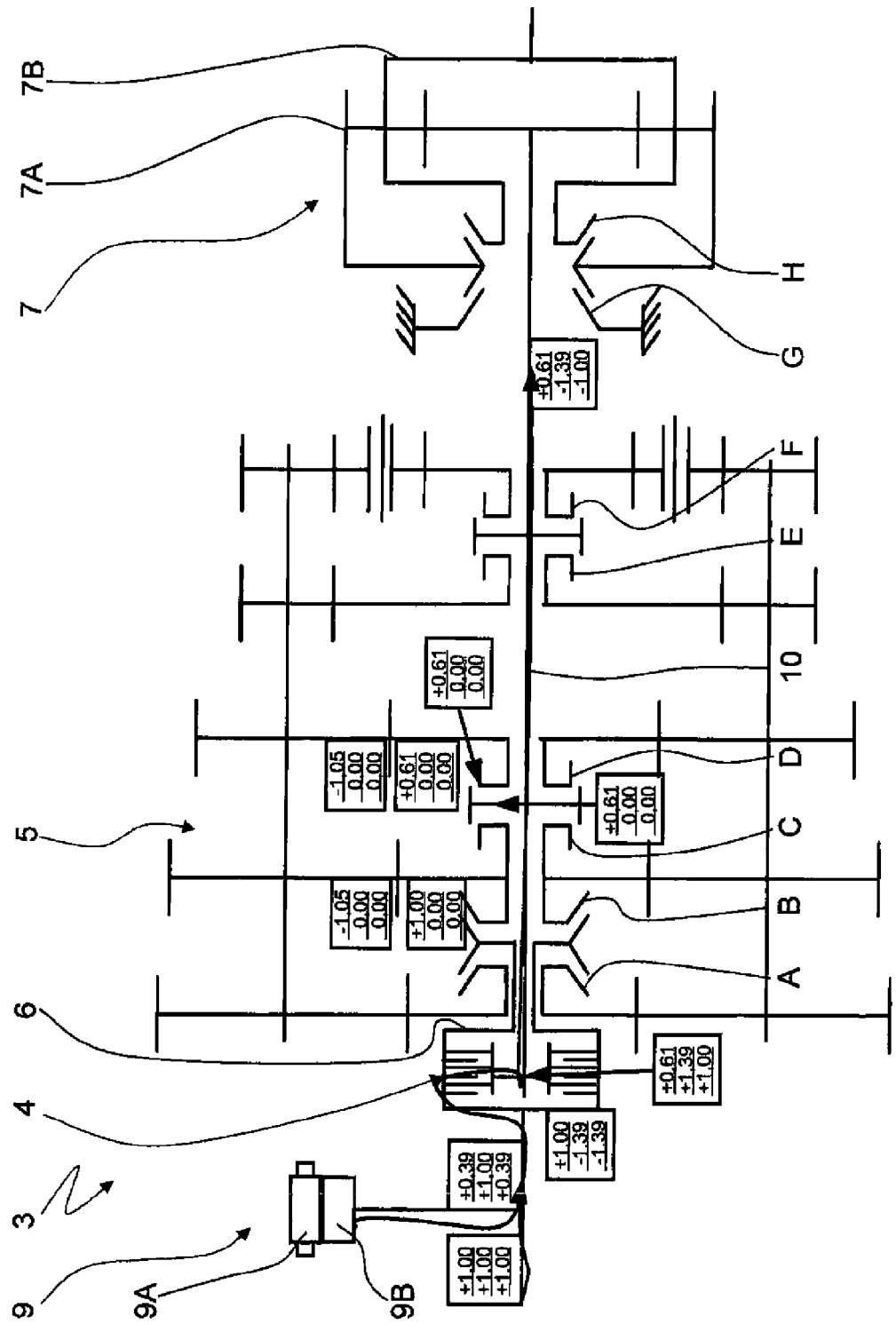
FIG. 6 A wheel diagram of the transmission device according to FIG. 4 with a graphically depicted torque flow with an engaged intermediate gear.
Figure 7:
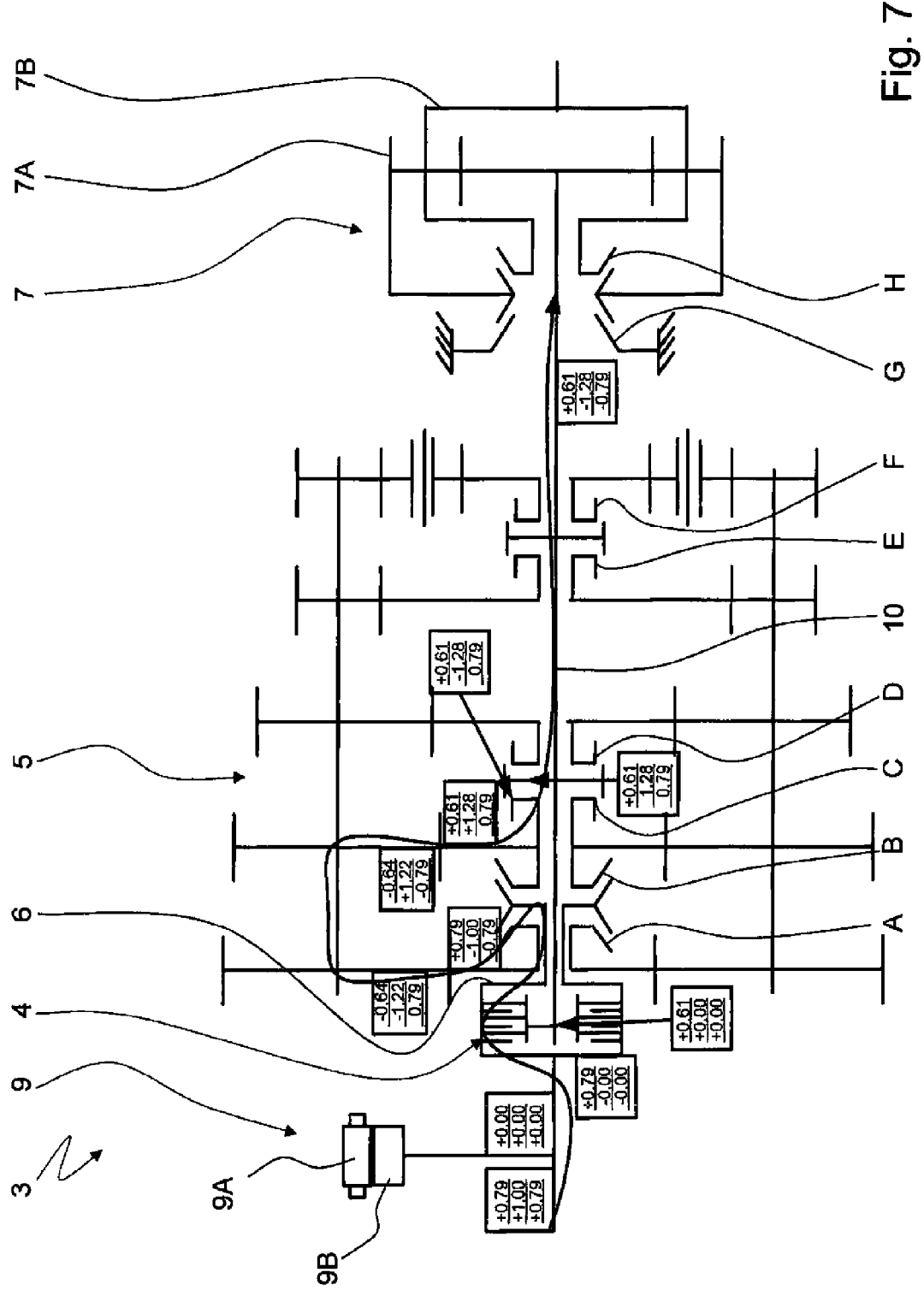
FIG. 7 The wheel diagram of the transmission device according to FIG. 4 with a graphically depicted torque flow with an engaged target gear.

The shifting elements C and D of the first transmission group 5 are without load in this operating state of the transmission device 3 and are disengaged, whereby the drive torque applied via the transmission input shaft 6 is transmitted in the manner depicted in FIG. 6 via the load-shifting element 4 that is operating in a slipping state and the main transmission shaft 10 in the direction of the second transmission group 7. Then the transmission capacity of the load-shifting element 4 is increased or, as the case may be, reduced in order to move the input speed of the internal combustion engine 2 toward the rotational speed of the target gear or, as the case may be, the eleventh forward drive position.

If it is detected that the internal combustion engine 2 has reached the input speed of the target gear or will reach it very soon, the shifting elements A and C of the first transmission group 5 are engaged and the load-shifting element 4 is disengaged, and the torque of the electric machine 9 is again reduced to zero, whereby only the drive torque of the internal combustion engine 2 is still transmitted in the way depicted through the transmission device 3. At this point in time, the required gear change has been carried out without interruption in torque and is completely finished.

Figure 8:
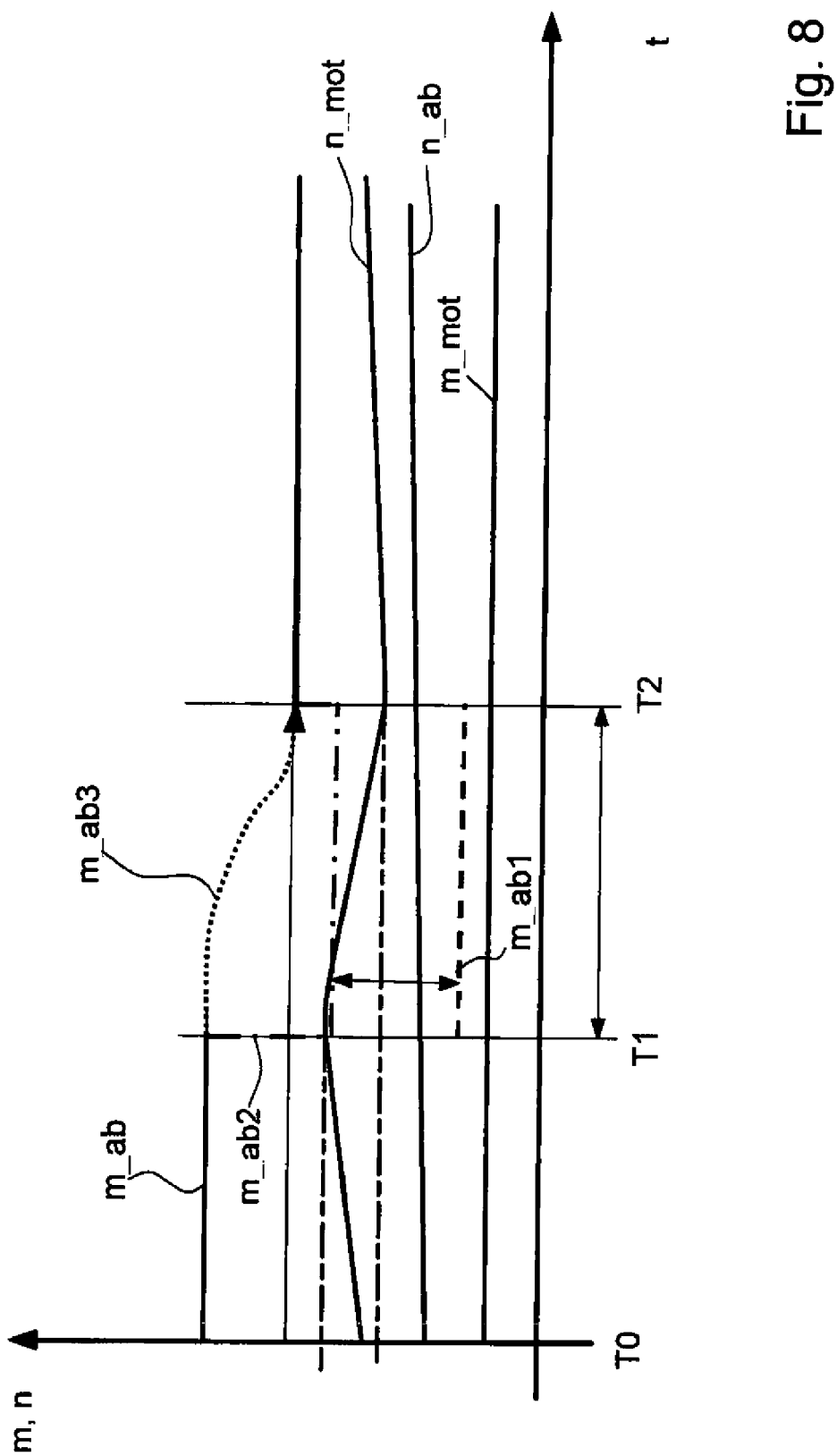
FIG. 8 Rotational speed and torque processes in the drive train of the vehicle shown in FIG. 1 that take place during a shifting operation in the inventive transmission device when the inventive method is used.

FIG. 8 shows a qualitative representation of different torque and rotational speed processes during the previously described shifting operation from the tenth forward drive position into the eleventh forward drive position with the engagement of the twelfth forward drive position as an intermediate gear and the connection of the electric machine 9.

At a point in time T0, the tenth forward drive position is engaged as the actual gear in the previously described manner in the transmission device 3 according to FIG. 4 to FIG. 7. Because the electric machine 9 is switched off, the output torque m_ab results from the product of the gear ratio $i_{10}$ of the tenth forward drive position and the driving torque m_mot of the internal combustion engine which remains constant during the entire shifting operation that is the basis for FIG. 8.

At a point in time T1, a shifting demand for an upshift starting from the tenth forward drive position into the eleventh forward driving position is implemented, whereby, depending on the actuation of the transmission device 3 between the point in time T1 and a point in time T2 at which the shifting operation is finished, various processes m_ab1, m_ab2 and m_ab3 take place in the output torque.

In this way, the process m_ab1 occurs between the points in time T1 and T2 during an automated shifting operation, whereas the output torque m_ab is determined from the product of the driving torque m_mot of the internal combustion engine 2 and the gear ratio $i_{12}$ of the intermediate gear.

The process m_ab2 of the output torque lies above the process m_ab1 and takes place due to the engagement of the intermediate gear without support from the electric motor. In the process, the output torque m_ab2 is determined by the following formula:

$$m\_ab2=(m\_mot+m\_dyn)*i_{12}$$

Here, the summand m_dyn represents a dynamic torque of the internal combustion engine 2, which is determined according to the following formula:

$$m\_dyn=(J\_mot+J\_pri)*\dot{\omega}\_mot$$

The degree k_zw of the tractive-force support from engaging an intermediate gear, on the other hand, is calculated according to the following formula:

$$k\_zw=((m\_mot)+m\_dyn)*i_{12})/(m\_mot*i_{11})$$

The process m_ab3 of the output torque occurs between the points in time T1 and T2 when an intermediate gear is engaged and there is support at the same time from the electric motor, whereas the output torque m_ab3 can be determined as follows subject to the driving torque m_mot of the internal combustion engine 2, the dynamic torque m_dyn of the internal combustion engine 2, and the driving torque m_EM of the electric engine 9:

$$m\_ab3=(m\_mot+m\_dyn+m\_EM)*i_{12}$$

In this way, the degree k_zw of torque support during a shifting operation with engagement of an intermediate gear and support from the electric motor can be determined as follows.

$$K\_zw=((m\_mot)+m\_dyn+m\_EM)*i_{12})/(m\_mot*i_{11})$$

The degree k_zw of torque support is equal to one, when the driving torque m_EM of the electric machine 9 matches the following term:

$$m\_EM=(m\_mot*i_{11}/i_{12}-1)-m\_dyn$$

With reference to the comparison in torque support presented graphically in FIG. 8, as well as the formulaic contexts shown above, it is seen that a shifting operation with engagement of an intermediate gear and simultaneous support from the electric motor can essentially be carried out without interruption in tractive force and with high shifting comfort, whereby the rotational speed n_mot of the internal combustion engine 2 and the output speed n_ab of the vehicle 1 according to FIG. 1 exhibit, in each case, the process depicted in FIG. 8 during upshifting from the tenth into the eleventh forward drive position while engaging the twelfth forward drive position as an intermediate gear and with simultaneous support from the electric motor, as well as with corresponding actuation of the load-shifting element 4.

Reference Characters
1 Vehicle
2 Internal combustion engine
3 Transmission device
4 Load-shifting element
5 First transmission group
6 Transmission input shaft
7 Second transmission group
7A Ring gear
7B Planet carrier
8 Starting element
9 Electric machine
9A Stator
9B Rotor
10 Main transmission shaft
11 Planetary gear set
11A Ring gear
11B Planet carrier
11C Sun gear
12 Additional shifting element
13 Engine output shaft
A-H Shifting element
m Torque
m_ab Output torque
m_mot Driving torque of the internal combustion engine
n Rotational speed
n_ab Output speed
n_mot Input speed of the internal combustion engine

The invention claimed is:

1. A transmission device (3) comprising at least first and second multi-gear transmission groups (5, 7), torque of a transmission input shaft (6) introducing torque into the first transmission group (5) and torque being transmitted to the second transmission group (7) via a main transmission shaft (10),
during a gearshift from an actual gear into a target gear, the transmission input shaft (6) being directly connectable, at least temporarily, to the main transmission shaft (10) via a load-shifting element (4) to achieve an intermediate gear,
an electric machine (9) introducing torque, via the load-shifting element (4), into the connected transmission input and main transmission shafts (6, 10), at least in the engaged intermediate gear; and
the second transmission group (7) being a planetary gear set which is lockable by a further shifting element (H).

2. The transmission device according to claim 1, wherein the electric machine (9) is directly connected to the transmission input shaft (6).

3. The transmission device according to claim 1, wherein the electric machine is connected to a shaft (11C) of a planetary gear set (11) and the transmission input shaft (6) is functionally connected to an additional shaft (11B) of the planetary gear set (11).

4. The transmission shaft according to claim 1, wherein electric machine (9) is functionally connected to the load-shifting element (4).

5. The transmission device according to claim 1, wherein the first transmission group (5), which is connected to the transmission input shaft (6), is a countershaft transmission.

6. The transmission device according to claim 5, wherein the countershaft transmission (5) is one of a single countershaft transmission and a dual countershaft transmission.

7. A method of operating a transmission device (3) comprising at least first and second multi-gear transmission groups (5, 7), a transmission input shaft (6) introducing torque via the transmission input shaft (6) into the first transmission group (5) and the torque being transmitted to the second transmission group (7) via a main transmission shaft (10), the transmission input shaft (6) being directly connectable, at least temporarily, to the main transmission shaft (10) via a load-shifting element (4), during a gearshift from an actual gear into a target gear, to achieve an intermediate gear, an electric machine (9) introducing torque, via the load-shifting element (4), into the connected transmission input and main transmission shafts (6, 10), at least in the engaged intermediate gear, the method comprising the steps of:
increasing a transmission capacity of the load-shifting element (4), during the gearshift from the actual gear into the target gear, until the transmission input shaft (6) and the main transmission shaft (10) are connected, and the first transmission group (5) is load-free, and then
disengaging at least one shifting element (B, D), provided for achieving the actual gear, the torque that is generated by the electric machine (9) and is rectified to torque acting on the transmission input shaft (6) is introduced into the transmission input and the main transmission shafts (6, 10) which are connected to each other via the load-shifting element (4), and
increasing the transmission capacity of the load-shifting element, to bring a rotational speed of the transmission input shaft (6) to level of a rotational speed of the target gear,
engaging an additional shifting element (A, C) to achieve the target gear,
disengaging the load-shifting element (4), and
reducing the torque of the electric machine (9) to at least approximately zero, when the rotational speed of the transmission input shaft (6) at least approximately matches the rotational speed of the target gear.

8. The method according to claim 7, further comprising the step of defining the value of the torque generated by the electric machine (9) as matching a change in torque caused by the gearshift, from the actual gear into the intermediate gear, compared to a torque acting on the transmission output with an engaged actual gear.

9. The method according to claim 7, further comprising the step of transferring a sum of the torque applied via the transmission input shaft (6) and the torque generated by the electric machine (9), from the transmission input shaft (6) to the main transmission shaft (10), in a slipping operation of the load-shifting element (4).

* * * * *